United States Patent [19]

Kummer et al.

[11] Patent Number: 4,607,347

[45] Date of Patent: Aug. 19, 1986

[54] MICROCOMPUTER SYSTEM EMPLOYING PROGRAM CARTRIDGES

[75] Inventors: David A. Kummer, Boca Raton; Gary E. Webb, Lake Worth, both of Fla.

[73] Assignee: International Business Machines Corporation, Armonk, N.Y.

[21] Appl. No.: 522,062

[22] Filed: Aug. 10, 1983

[51] Int. Cl.⁴ .............................................. G06F 12/00
[52] U.S. Cl. .................................................. 364/900
[58] Field of Search ... 364/200 MS File, 900 MS File; 273/1 E, 85 G, DIG. 28

[56] References Cited

U.S. PATENT DOCUMENTS 4,386,773  6/1983  Bronstein ........................... 273/1 E
4,506,346  3/1985  Bennett et al. ...................... 364/900

Primary Examiner—Thomas M. Heckler

[57] ABSTRACT

A microcomputer system employs internal read-only memory devices and external read-only memory devices in pluggable cartridges. Each cartridge includes jumper links in leads from the external memories through the cartridge socket to a memory select unit and jumper links in leads leading from earth through the cartridge socket to enable inputs of the internal memories. By linking selected ones of the jumper links in the cartridge, the external memory can be used as an add-on memory or as a base memory replacing the internal memory.

4 Claims, 1 Drawing Figure

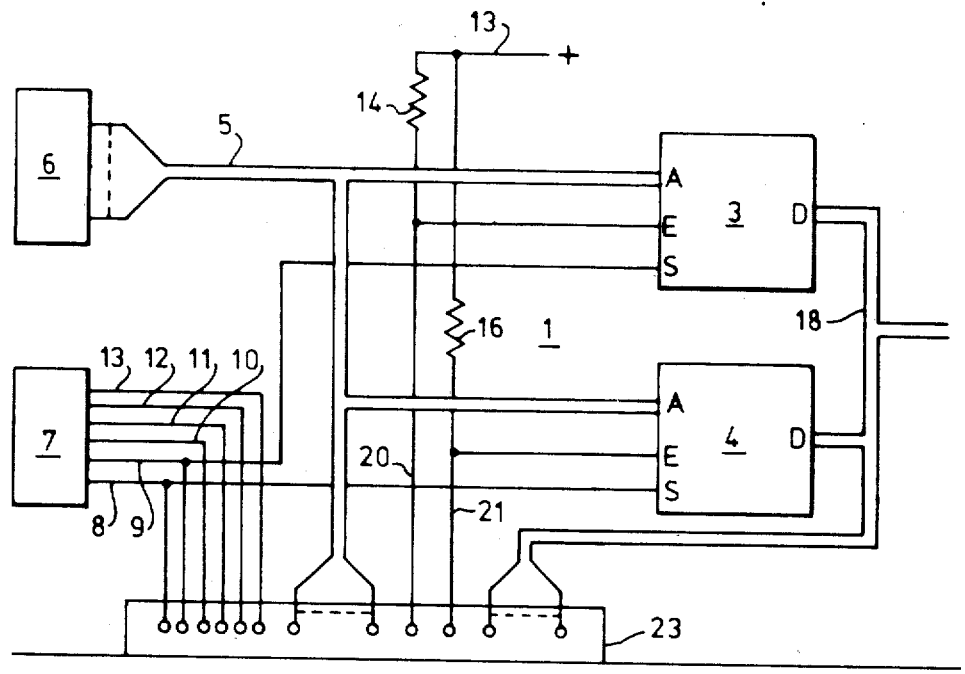
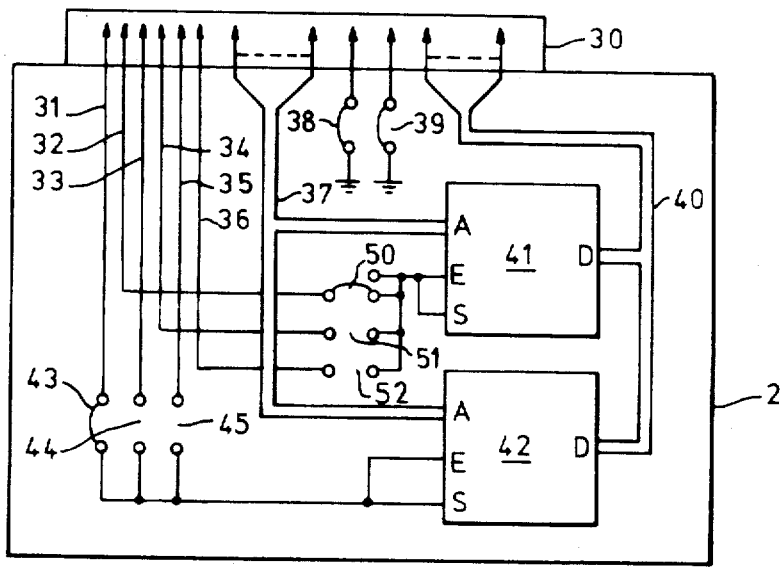

MICROCOMPUTER SYSTEM EMPLOYING PROGRAM CARTRIDGES

TECHNICAL FIELD

The present invention relates to microcomputer systems, and in particular to such systems which are adapted to employ program cartridges.

BACKGROUND ART

Program cartridges are at present used in many microcomputer systems. They were first introduced in the field of games computers to provide program data defining different games which can be played.

Essentially, a program cartridge comprises a read-only store mounted on a printed circuit board which includes connection pads for connection to a microcomputer through a socket mounted in the microcomputer. U.S. Pat. No. 1,595,156 (Asher and Hardy) shows the arrangement of a typical cartridge device. The cartridge read-only memory normally contains control code which is additional to control code contained in read-only memory in the microcomputer itself. Thus, in operation, the microcomputer is essentially controlled by the control code held internally and requests extra code for different applications from the cartridge read-only memory.

It has now been recognised that in certain conditions, it may be desirable to provide the base control code from a cartridge rather than the internal read-only memories. This enables complete re-configuration of the microcomputer by changing the base control code. It is to effect such change of control that the present invention is directed.

DISCLOSURE OF THE INVENTION

The present invention provides a system in which cartridges can be configured, by means of links in their wiring either to provide add-on code to the base code held in internal read-only memory in a microcomputer or to replace the base code by disabling the internal read-only memory and re-directing read-only memory select signals.

BRIEF DESCRIPTION OF DRAWINGS

The single FIGURE shows a portion of a microcomputer, in particular the read-only memory circuits, and a program cartridge pluggable into the microcomputer.

DESCRIPTION OF PREFERRED EMBODIMENT OF THE INVENTION

The accompanying drawing shows a portion 1 of a microcomputer and a program cartridge 2 which is pluggable into the microcomputer.

The microcomputer includes two read-only memory devices 3 and 4. Each of these ROM's includes an address input A, an enable input E, a chip select input S and a data output D. Assuming the ROM's are of 32K size, the address input of each comprises a fifteen line bus 5, coupling an address unit 6 to the ROM address inputs in common. This address unit is coupled to the CPU of the microcomputer to develop these addresses for the ROM's. In addition, the CPU develops three-bit chip select signals, which are decoded by a decoder 7 to provide outputs on lines 8 through 13. In response of a particular three bit pattern, decoder 7 is operable to energise a selected one of lines 8 through 13. In this particular embodiment, six of these lines are provided to select from six ROM's, of which four only are shown. Energisation of one of the lines 8 through 13 selects a ROM through its chip select input S.

The enable input E of ROM 3 is coupled to a positive supply line 13 through a resistor 14. Similarly the enable input of ROM 4 is coupled to the supply line through a resistor 16. With cartridge 2 removed from the microcomputer as shown in the FIGURE, the enable inputs E of ROM's 3 and 4 are maintained positive by these couplings so that each ROM is permanently enabled. In operation, an address from address unit 6 together with a select signal on line 9 provides an 8-bit data output on data bus 18 from ROM 3 and an address together with a select signal on line 8 results in a data output from ROM 4.

In order to couple cartridge 2 to microcomputer 1, the latter includes a socket 23. This socket includes contacts connected to the chip select lines 8 through 13, the address bus 5, lines 20 and 21 coupled to the resistors in the enable circuits, and the data bus 18. Other contacts (not shown) are coupled to ground and the power supply line to provide ground reference and power to the cartridge.

The cartridge includes a plug section 30 containing edge connectors which mate with the socket contacts when the cartridge is inserted into the socket. Reading from left to right, the first six connectors couple lines 31 through 36 on the cartridge to lines 8 through 13 in the microcomputer. The next group of contacts, fifteen in all, couple an address bus 37 to address bus 5 of the microcomputer. Next, two lines couple jumper socket pairs 38 and 39 to enable lines 20 and 21 of the microcomputer. Lastly, the right-most set of connectors couple a data bus 40 to data bus 18 of the microcomputer. When the socket is in position, the two ROM's which it carries have their address inputs coupled in parallel with the address inputs of ROM's 3 and 4 through busses 37 and 5. Similarly, the data outputs of ROM's 41 and 42 are coupled in parallel with the data outputs of ROM's 3 and 4 through data busses 40 and 18.

Lines 31, 33 and 35 are connected respectively to one side of jumper socket pairs 43 through 45, the other sides of which are connected in common to the enable input E and chip select input S of ROM 42. Lines 32, 34 and 36 are similarly connected to one side of a further set of jumper socket pairs 50 through 52, the other sides of which are coupled in common to inputs E and S of ROM 41.

Ignoring, for the moment, the positions of the jump leads in the FIGURE, we will first look at the operation of the cartridge in the normal mode of operation of cartridges, that is, when it is used as an add-on device providing an extension of the control code contained in the internal ROM's 3 and 4. In such an operation, there are no jump leads in jumper socket pairs 38, 39, 43, or 50. Instead there will be a jump lead in one of jumper socket pairs 44 and 45, and another in one of pairs 51 and 52. As an example, let us say that jumper socket pairs 45 and 52 are bridged. Then, an address on busses 5 and 37 will access ROM 3 when select line 9 from decoder is energised, ROM 4 when select line 8 is energised, ROM 41 when select line 13 is energised and ROM 42 when select line 12 is energised. Note that with the links in jumper pairs 38 and 39 removed, ROM's 3 and 4 are permanently enabled, and that ROM's 41 and 42 are enabled as well as selected by the select lines.

Thus, in this particular example, by selection of any one of the select lines 8, 9, 12 and 13, and generation of a ROM address on bus 5, any location of any one of the four ROM's can be accessed. It may be noted here that the six, instead of four select lines are provided to allow another cartridge to be inserted into a further socket in the microcomputer which is connected in parallel with socket 23. Thus, with the six select lines, the system can be expanded by another two ROM's.

We will now consider the operation of the system with the jumpers inserted as shown in the drawing. The first thing to note is that the links in jumper pairs 38 and 39 now ground the enable inputs to ROM's 3 and 4, thereby disabling these ROM's. Next, the link in jumper pair 43 directs a chip select signal on line 8 to ROM 42 as well as ROM 4. Similarly chip select line 9 is coupled, through line 32 and the link in jumper pair 50, to ROM 41 as well as its direct path to ROM 3. Thus, when line 8 is now energised, the address on busses 5 and 37 accesses a location in ROM 42 rather than ROM 4. Similarly when chip select line 9 is energised, ROM 41 is accessed rather than ROM 3. Thus, when the jumpers are positioned as shown, the main control of the microcomputer passes from the base ROM's 3 and 4 to ROM's 41 and 42. This means that the microcomputer can be completely reconfigured merely by plugging in the cartridge.

Typically, a base ROM system may contain power on routines including power on diagnostics, basic input and output routines, operational diagnostics and other operational control routines, such as cassette BASIC routines. Whenever the system is turned on or reset, the processor begins execution under the control of the base ROM system. If, therefore, a cartridge which is configured to re-map the base ROM, the system will begin operation under the control of the cartridge ROM whenever it is turned on or reset. Apart from the reconfiguring the system to a particular users exact requirement, the re-mapping of base ROM system to the cartridge ROM system has other advantages. It can, for example, be used by the manufacturer to reset the system directly to a manufacturing test code, defined by the cartridge ROM system, without having to execute the base ROM power on diagnostics. In this operation, error messages could be steered to a communications port, instead of the normally used display system to communicate errors to a central computer test tracking system.

Another possible advantage is in the field of copy protection for the cartridge. Since, when the cartridge is plugged into the system, control passes completely to the cartridge code, no system utility can then be used to dump to contents of the cartridge. This, therefore makes it more difficult to copy the cartridge code.

It is clear that certain modifications in construction and operation of the system as described can be made. Firstly, the number of ROM's can be varied. For example, the cartridges could each include only one ROM, or both the cartridge and the base system could comprise three ROM's. In operation, either one, or both of the base ROM's can be disabled by selection of the links in jumpers 38 and 39. Though the jumpers have been described as jumper sockets, it is clear that their function could be achieved by selectively breaking printed circuit leads on the printed circuit board of the cartridge, or by employing fusible links which could be broken electrically.

While the invention has been particularly described with reference to a preferred embodiment, it will be understood by those skilled in the art that various other changes in form and detail may be made without departing from the spirit and scope of the invention.

What is claimed is:

1. A microcomputer system comprising, in combination, a microcomputer and a program cartridge removably mounted into the microcomputer, said microcomputer comprising internal read-only memory means having an address input, a select input and an enable input, address means for driving an address bus coupled to said address input, select means for selectively driving a plurality of select lines, including a first select line coupled to said select input, enable means for energizing an enable line coupled to said enable input, and socket means connected to said address bus, said select lines and said enable line, said program cartridge including plug means for mounting into said socket means, external read-only memory means having an address input and a select input, an external address bus for connecting the address input of the external memory means to the address bus of the microcomputer through the plug and socket means, a plurality of external select lines, each including a selectively connectable link, for selectively connecting the select input of the external memory means to said select lines, including said first select line, in the microcomputer through the plug and socket means, and a disable line including a selectively connectable link, for selectively coupling disabling means in the cartridge to said enable line through the plug and socket means, whereby, upon insertion of the plug into the socket, the external memory means supplements or replaces the internal memory means in accordance with selective connection of said links.

2. A microcomputer system according to claim 1, in which said internal read-only memory means comprise a plurality of memory modules, each having an address input coupled to said address bus, a select input coupled to an associated select line, and an enable input coupled to an associated enable line connected to said enable means and in which the program cartridge includes a plurality of disable lines, each including a selectively connectible line and each for selectively coupling said disabling means to an associated enable line through the plug and socket means.

3. A microcomputer system according to claim 2, in which said external read-only memory means comprises a plurality of memory modules each having an address input coupled to said external address bus and a select input coupled to selected ones of said external select lines.

4. A microcomputer system according to claim 3, in which said enabling means comprise circuit means providing a signal level to enable the internal memory means, and said disabling means comprises means for changing said signal level to disable the internal memory means when coupled to an enable line through a said link and the plug and socket.

* * * * *